(12) United States Patent
Ichimura et al.

(10) Patent No.: US 7,042,002 B2
(45) Date of Patent: May 9, 2006

(54) QUANTUM MEMORY AND INFORMATION PROCESSING METHOD USING THE SAME

(75) Inventors: Kouichi Ichimura, Yokohama (JP); Noritsugu Shiokawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/046,727

(22) Filed: Feb. 1, 2005

(65) Prior Publication Data

US 2005/0190637 A1    Sep. 1, 2005

Related U.S. Application Data

(62) Division of application No. 10/771,288, filed on Feb. 5, 2004, now Pat. No. 6,849,863.

(30) Foreign Application Priority Data

Feb. 6, 2003    (JP) ............................. 2003-029549

(51) Int. Cl.
*H01L 29/06* (2006.01)
*H01L 31/0328* (2006.01)
*H01L 31/0336* (2006.01)
*H01L 31/072* (2006.01)
*H01L 31/109* (2006.01)

(52) U.S. Cl. ........................................ 257/14; 257/183
(58) Field of Classification Search ................... None
See application file for complete search history.

(56) References Cited

U.S. PATENT DOCUMENTS 3,754,988 A * 8/1973 Barnes ........................ 216/22

| | | |
|---|---|---|
| 5,663,571 A | 9/1997 | Ugajin |
| 5,699,374 A | 12/1997 | Ichimura et al. |
| 5,898,720 A | 4/1999 | Yamamoto et al. |
| 6,337,293 B1 | 1/2002 | Ishii et al. |
| 6,597,010 B1 | 7/2003 | Eriksson et al. |

OTHER PUBLICATIONS

Duan et al.; "Quantum Communication Between Atomic Ensembles Using Coherent Light"; The American Physical Society, Physical Review Letters, vol. 85, No. 26, pp. 5643-5646, (2000).

Julsgaard et al.; "Experimental Long-Lived Entanglement of TWA Macroscopic Objects"; Nature, vol. 413, No. 27, pp. 400-403, (2001).

* cited by examiner

*Primary Examiner*—Ngân V. Ngô
(74) *Attorney, Agent, or Firm*—Finnegan, Henderson, Farabow, Garrett & Dunner, L.L.P.

(57) ABSTRACT

A quantum memory includes memory cells each comprising a physical system ensemble, quantum information of the physical system ensemble being expressed by a quantum state of whole amount of the total angular momentum of the physical systems, and the memory cells including two storage memory cells storing the quantum state and a transfer memory cell transferring the quantum state, only two of the memory cells being present on a straight line. The quantum memory also includes a magnet applying a magnetic field to the two storage memory cells and the transfer memory cell, a first light source irradiating the two storage memory cells and the transfer memory cell with right-handed or left-handed polarized light, a second light source simultaneously irradiating one of the two storage memory cells and the transfer memory cell with a laser beam, and a detector detecting a polarization state of the laser beam.

7 Claims, 3 Drawing Sheets

QUANTUM MEMORY AND INFORMATION PROCESSING METHOD USING THE SAME

CROSS-REFERENCE TO RELATED APPLICATIONS

This application is a division of application Ser. No. 10/771,288, filed Feb. 5, 2004 now U.S. Pat. No. 6,849,863, which is incorporated in its entirety herein by reference. This application is also based upon and claims priority from prior Japanese Patent Application No. 2003-029549, filed Feb. 6, 2003, the entire contents of which are incorporated herein by reference.

BACKGROUND OF THE INVENTION

1. Field of the Invention

The present invention relates to a quantum memory that enables transfer of quantum information, and an information processing method using the quantum memory.

2. Description of the Related Art

Quantum information processing techniques such as quantum calculations and quantum communications use the quantum state of a physical system to represent information so as to process the information by manipulating the quantum state. With these techniques, a physical system and structure suitable for manipulation of the quantum state is generally different from a physical system and structure suitable for storage of quantum information. Thus, the need for a quantum memory intended to store quantum information has been recognized. Furthermore, in quantum communications, a quantum memory is required to store quantum information carried by the quantum state of light, as the quantum state of a stationary physical system, and to reproduce and utilize the stored information as required.

Such a quantum memory has the following requirements (1) to (3). (1) The quantum memory must be able to retain the quantum state for a time sufficient to process information. (2) The quantum memory must appropriately resist noise. (3) The quantum memory must be able freely transfer quantum information in a simple manner between arbitrary memory cells in the memory assigned for storage or between such a memory cell in the memory and a physical system expressing a quantum bit in a gate executing calculations. However, there have not been any quantum memories that meet these requirements.

In particular, in connection with the transfer of quantum information, i.e., the quantum state referred to in the above item (3), it is impossible in principle to perform an operation of reading complete quantum information on a general quantum state and then writing it to a different quantum bit. On the other hand, the quantum state can be transferred utilizing a method called "quantum teleportation" which transmits the whole quantum state to a different physical system without reading information on the quantum state. However, there have not been any quantum memories that can carry out teleportation between arbitrary quantum bits using a practical method. To efficiently process quantum information, it is important to transfer quantum information within a quantum memory or to temporarily transfer quantum information from a calculation section (gate section) to a memory section and to return the quantum information to the calculation section as required.

In recent years, a method has been proposed which generates entanglement (a quantum-mechanically entangled state) between atomic ensembles simply by allowing classical laser light (coherent light) to act on the atomic ensembles and observing the polarization of transmitted laser light (Lu-Ming Duan et al., Phys. Rev. Lett., 85(26), 5643 (2000)). In September 2001, the results of experiments were disclosed which verify a method almost equivalent to the above method (B. Julsgaard et al., Nature 413, 400 (2000)).

With the method of Duan et al., entanglement is generated for atomic ensembles 1 and 2 by irradiating the atomic ensembles 1 and 2 with classical laser light so that the light pierces the ensembles and subjecting the transmitted light to homodyne detection. This method generates entanglement utilizing the quantum state of atomic ensembles instead of a single atom or photon. This method thus advantageously resists noise. Furthermore, it can utilize atoms in a free space and thus does not require any high-performance optical resonators. It can also generate entanglement using classical intense laser light. Thus, this is a simple, convenient, and practical method for generating entanglement.

The entanglement generation is an important technique that plays a key role in quantum teleportation. Accordingly, if the entanglement generating method and quantum teleportation utilizing the method could be utilized to freely transfer quantum information within a quantum memory, they are expected to constitute simple, convenient, practical, and excellent means for transferring quantum information. However, no methods have been known which utilize the entanglement generation based on the above method and quantum teleportation to freely transfer quantum information within a quantum memory.

BRIEF SUMMARY OF THE INVENTION

It is an object of the present invention to provide a quantum memory that can freely transfer quantum information between two arbitrary memory cells while avoiding interference from other memory cells, as well as an information processing method using such a quantum memory.

A quantum memory according to an aspect of the present invention comprises: a memory cell section of a plurality of memory cells, each of the plurality of the memory cells comprising a physical system ensemble, the physical system ensemble comprising physical systems configured to have a total angular momentum of magnetic sublevels, the physical system ensemble being configured to have quantum information expressed by a quantum state of whole amount of the total angular momentum of magnetic sublevels, the plurality of memory cells comprising two storage memory cells storing the quantum state and a transfer memory cell transferring the quantum state, and substantially strait line units each extending from an edge to another edge of the memory cell section and each consisting of one of the two storage memory cells and the transfer memory cell; a magnet configured to apply a magnetic field to the two storage memory cells and the transfer memory cell; a first light source configured to irradiate the two storage memory cells and the transfer memory cell with right-handed or left-handed polarized light; a second light source configured to simultaneously irradiate the storage memory cell and the transfer memory cell of one of the substantially strait line units with a laser beam; and a detector configured to detect a polarization state of the laser beam.

A quantum memory according to another aspect of the present invention comprises: memory cells each comprising a physical system ensemble, the physical system ensemble comprising physical systems configured to have a total angular momentum of magnetic sublevels, quantum information of the physical system ensemble being expressed by a quantum state of whole amount of the total angular momentum of the physical systems, and the memory cells including two storage memory cells storing the quantum state and a transfer memory cell transferring the quantum state, only two of the memory cells being present on a straight line; a magnet configured to apply a magnetic field to the two storage memory cells and the transfer memory cell; a first light source configured to irradiate the two storage memory cells and the transfer memory cell with right-handed or left-handed polarized light; a second light source configured to simultaneously irradiate one of the two storage memory cells and the transfer memory cell with a laser beam; and a detector detecting a polarization state of the laser beam.

According to still another aspect of the present invention there is provided an information processing method using a quantum memory in which memory cells are provided, each of the memory cells being formed of a physical system ensemble, the physical system ensemble comprising physical systems configured to have a total angular momentum of magnetic sublevels, quantum information of the physical system ensemble being expressed by a quantum state of whole amount of the total angular momentum of the physical systems, at least one of the memory cells being used as a transfer memory cell A transferring the quantum state, memory cells other than the transfer memory cell A being used as storage memory cells storing the quantum state, and in which a set of two arbitrary memory cells V and B is selected from the storage memory cells and the quantum state of the memory cell V is transferred to the memory cell B, the method comprising: applying a magnetic field to each memory cell and irradiating each memory cell with right-handed or left-handed polarized light to establish an energy state in which the total angular momentum of the entire physical system ensemble forming each memory cell has a particular value; simultaneously irradiating only the two memory cells A and B with one laser beam, detecting a polarization state of the laser beam transmitted through both memory cells, and generating entanglement for the memory cells A and B; and simultaneously irradiating only the two memory cells A and V with one laser beam, detecting a polarization state of the laser beam transmitted through both memory cells, and teleporting the quantum state of the memory cell V to the memory cell B in which the entanglement with the memory cell A has been generated.

DETAILED DESCRIPTION OF THE INVENTION

A quantum memory according to embodiments of the present invention comprises memory cells each of which is formed of a physical system ensemble capable of assuming such an energy state that a total angular momentum has magnetic sublevels, quantum information of the physical system being expressed by a quantum state of whole amount of the total angular momentum of magnetic sublevels. The physical system ensemble may be gas atoms or rare earth ions included in a solid. Alternatively, the memory cell may be formed of a physical system ensemble which is distributed in a part of a space where an ensemble angular momentum is generated by selectively irradiating a spatially continuously and uniformly distributed substance with light. It is known that a quantum memory appropriately resists noise is obtained by generating entanglement between such physical system ensembles.

A coil or a permanent magnet may be used as a magnet applying a magnetic field to each memory cell. A laser may be used as a first light source that irradiates each memory cell with right-handed or left-handed polarized light and as a second light source that irradiates two of the memory cells with one laser beam. A homodyne detector may be used to detect the polarization state of the laser beam transmitted through the two memory cells.

First, description will be given of quantum teleportation utilized to transfer information between memory cells in the quantum memory according to the embodiments of the present invention.

Physical amounts utilized to represent the quantum state are two components $J_z$ (operator) and $J_y$ (operator) of the ensemble angular momentum of the whole physical system ensemble consisting of atoms, molecules, or the like. These two physical amounts are conjugate, and their communication relationship is expressed by the following equations:

$$[J_z, J_y] = iJ_x, \text{ or } [J_z/J_x^{1/2}, J_y/J_x^{1/2}] = i.$$

The angular momentum consists of an electron spin, the orbital motion of an electron, and a nuclear spin, and is accompanied with magnetic sublevels.

A squeezing state of these two physical amounts, i.e., an amount indicating uncertainty of respective variables satisfying an uncertainty relationship, can be transferred from one physical system ensemble to another (referred to as a "physical system ensemble V" and a "physical system ensemble B").

Figure 1:
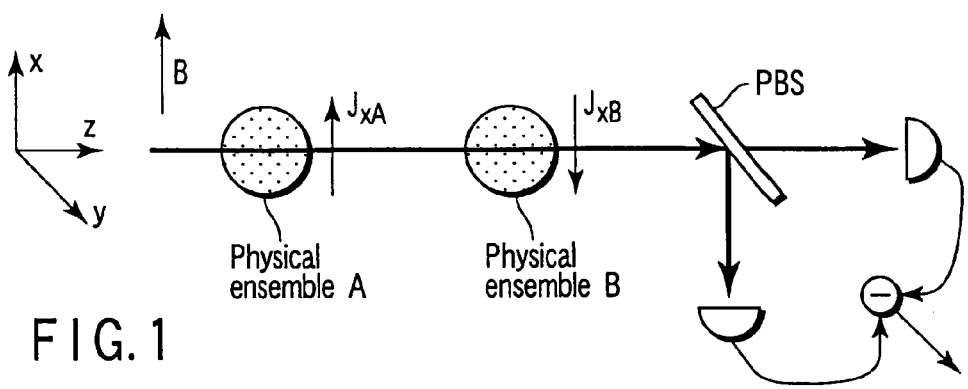
FIG. 1 is a diagram illustrating a method of generating entanglement among physical system ensembles.

First, entanglement is generated between two physical system ensembles (referred to as a "physical system ensemble A" and the "physical system ensemble B"). A method for generating entanglement will be described below with reference to FIG. 1. As shown in FIG. 1, the physical system ensembles A and B having ensemble angular momenta $J_{xA}=J_x$ and $J_{xB}=-J_x$, respectively, are provided in a magnetic field B applied in an x-axis direction. Then, these two physical system ensembles are irradiated with linearly polarized laser light (laser light for entanglement generation) polarized in the x-axis direction. The laser light joins $J_z$ (operator) and $J_y$ (operator) together by the entanglement.

On the other hand, for the laser light, the following definitions are given. Stokes operators for a laser pulse are defined as $S_x$, $S_y$, and $S_z$. $S_x$ denotes a difference in the number of photons between linearly polarized light in the x direction and linearly polarized light in the y direction. $S_y$ denotes a difference in the number of photons between light polarized in the +45° direction and light polarized in the −45° direction. $S_z$ denotes a difference in the number of photons between right-handed polarized light and left-handed polarized light both of which travel in the z-axis direction. Then, the commutation relationship is expressed by the following equation:

[$S_y$, $S_z$]=$iS_x$.

Entanglement occurs between $S_y$ and $S_z$.

If the physical system ensembles are irradiated with the laser light at a wavelength selected so as not to be resonant with optical transitions, then a polarization state $S_y^{out}(t)$ represented by the operator $S_y$ for the transmitted light is expressed by the equation shown below, utilizing a polarization state $S_y^{in}(t)$ represented by the operator $S_y$ for the incident laser light, the angular momenta of the physical ensemble momenta $J_{zAB}=J_{zA}+J_{zB}$ and $J_{yAB}=J_{yA}+J_{yB}$, and the angular frequency $\Omega$ of the Larmor precession of $J_z$ and $J_y$ resulting from the application of a magnetic field.

$S_y^{out}(t)=S_y^{in}(t)+\alpha[J_{zAB}\cos(\Omega t)+J_{yAB}\sin(\Omega t)]$ ($\alpha$ is a constant) (see B. Julsgaard et al., Nature 413, 400(2001)).

Consequently, the angular momenta $J_{zAB}=J_{zA}+J_{zB}$ and $J_{yAB}=J_{yA}+J_{yB}$ can be simultaneously detected by allowing the laser light transmitted through the physical system ensembles A and B to pass through a polarized beam splitter (PBS) for homodyne detection and measuring the $\cos(\Omega t)$ component and $\sin(\Omega t)$ component of the polarization state corresponding to $S_y^{out}(t)$. Moreover, measurements are made to obtain variance among the measured values. If the variance has a value close to zero, strong quantum correlation can be confirmed indicating the entanglement between the physical system ensembles A and B.

Figure 2:
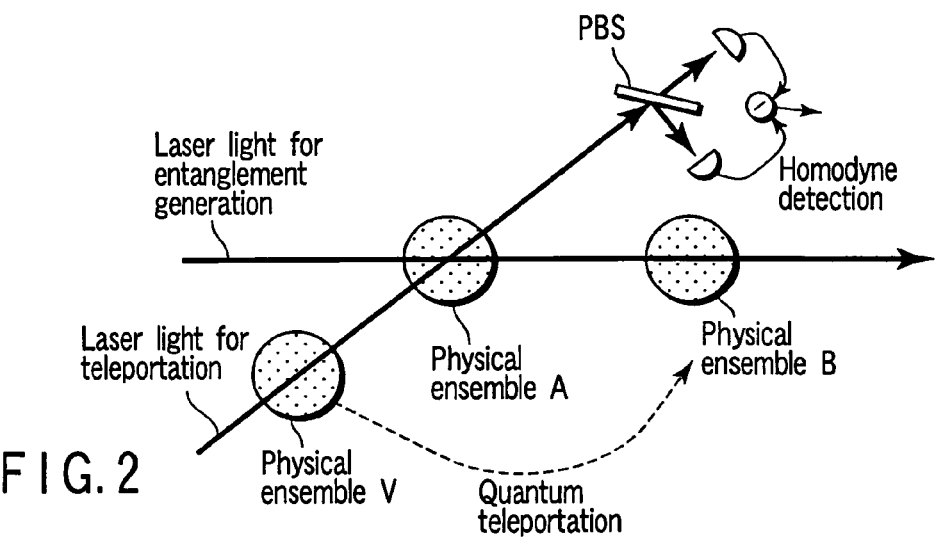
FIG. 2 is a diagram illustrating quantum teleportation between the physical system ensembles.

For the physical system ensembles A and B, jointed together by the entanglement as described above, the quantum state of the physical system ensemble V is to be transferred to the physical system ensemble B. A method for achieving this transfer will be described below with reference to FIG. 2. In this case, the quantum state of the physical system ensemble V can be transferred to the physical system ensemble B (quantum teleportation can be carried out) by making Bell measurement between the physical system ensemble V and the physical system ensemble A. The Bell measurement comprise measuring the physical amounts $J_{zAB}=J_{zA}+J_{zB}$ and $J_{yAB}=J_{yA}+J_{yB}$ as a whole without distinguishing the physical system ensemble V from the physical system ensemble A. Accordingly, Bell measurement can be made by allowing the laser light (laser light for teleportation) transmitted through the physical system ensembles V and A to pass through the polarized beam splitter (PBS) for homodyne detection. Therefore, the quantum state can be transferred from the physical system ensemble V to the physical system ensemble B.

In this case, the quantum state of the physical system ensemble B is similar to the original quantum state of the physical system ensemble V, but not always be exactly the same. If exactly the same quantum state is to be reproduced, a correction may be made by properly allowing an electromagnetic field or the like to act on the physical system ensemble B in accordance with the result of the Bell measurement. In the description of the examples below, a quantum state is transferred to be a similar quantum state. However, corrections may be made as required in order to transfer a quantum state exactly to be the same quantum state.

Description has been given of the mechanism of the method of using a physical system ensemble to represent a quantum state and transferring the quantum state of one physical system ensemble to another by quantum teleportation.

Next, description will be given below of conditions required to freely transfer quantum information (a quantum state) between memory cells if physical system ensembles are provided and used as memory cells to construct a quantum memory.

Now, it is assumed that quantum information is to be transferred from an arbitrary memory cell M1 (corresponding to the physical system ensemble V) of the memory cells (physical system ensembles) to another arbitrary memory cell M2 (corresponding to the physical system ensemble B). First, an arbitrary third memory cell (corresponding to the physical system ensemble A) is set as a transfer memory cell transferring the quantum state. The third memory cell is basically utilized only for transfer in contrast with the storage memory cells storing the quantum state. Then, entanglement is generated between the memory cells M2 and M3. Specifically, both the memory cells M2 and M3 are irradiated with the same laser light so that the light passes sequentially through the memory cells M2 and M3. The transmitted light is then subjected to homodyne detection to generate entanglement between the memory cells M2 and M3. The generation of entanglement is then confirmed. Finally, the memory cells M1 and M3 are irradiated with the same laser light so that the light passes sequentially through the memory cells M1 and M3. The transmitted light is then subjected to homodyne detection. Bell measurement is then carried out for the memory cells M1 and M3 to transfer (teleport) quantum information from the memory cell M1 to the memory cell M2.

The embodiments of the present invention prevent the laser light used to generate entanglement between the memory cells M2 and M3 (laser light for entanglement generation) and the laser light used to make the Bell measurement of the memory cells M1 and M3 for teleportation (laser light for teleportation) from interacting with storage and transfer memory cells other than the memory cells M1, M2, and M3.

To achieve this, the memory cells are arranged so that for a set of two arbitrary memory cells (M1 and M2) selected to store the quantum state, only two memory cells are present on a straight line (straight line M1-M3 or M2-M3) joining each of the set of memory cells (each of the memory cells M1 and M2) and one transfer memory cell (M3) together.

Figure 3:
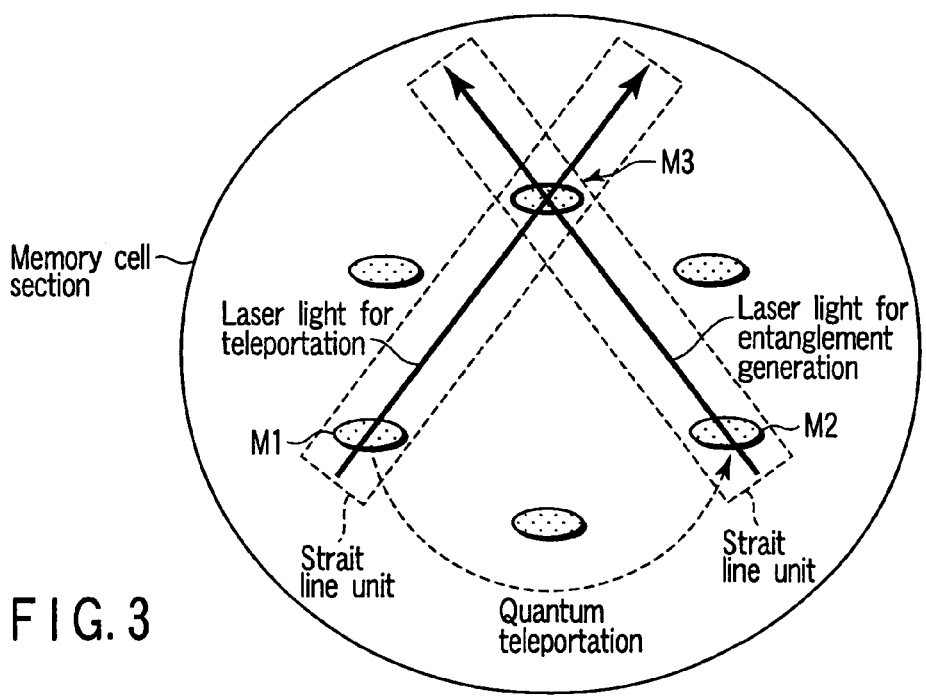
FIG. 3 is a diagram showing an example of the arrangement of memory cells in which quantum information can be transferred between arbitrary storage memory cells.

For example, as shown in FIG. 3, six memory cells are provided in a memory cell section. The memory cells are arranged on the same circumference. One of the memory cell is used as a transfer memory cell (M3), while the other five are used as storage memory cells.

Figure 4:
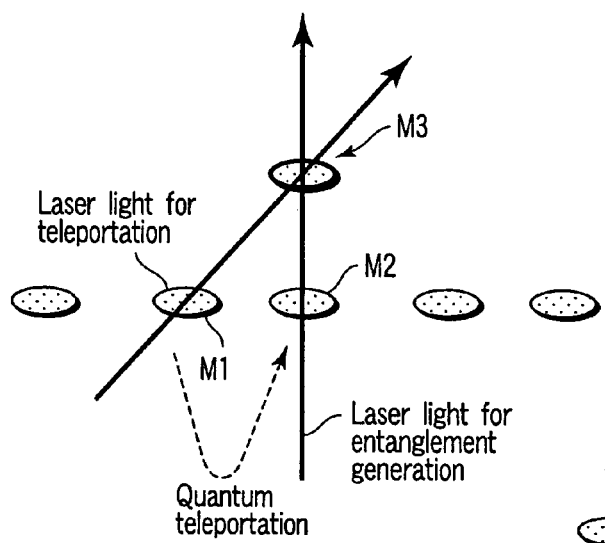
FIG. 4 is a diagram showing an example of the arrangement of memory cells in which quantum information can be transferred between arbitrary storage memory cells.

Alternatively, as shown in FIG. 4, six memory cells are provided. Five storage memory cells are arranged on the same straight line. One transfer memory cell is arranged off the straight line on which the storage memory cells are arranged.

Alternatively, as described in the example below, memory cells may be arranged on the same plane at the vertices of a regular polygon having an odd number of vertices and at the center of the regular polygon. The memory cell arranged at the center of the regular polygon may be used as a transfer memory cell (M3). This is also an example in which only two of the memory cells are present on the same straight line.

If the memory cells are arranged as described above, then only two memory cells are present on the straight line (straight line M1-M3 or M2-M3) joining each of the set of memory cells (each of the memory cells M1 and M2) and one transfer memory cell (M3) together. Thus, the set of the two memory cells is referred to as a strait line unit. Consequently, quantum information can be transferred between arbitrary quantum bits used to store the quantum state while avoiding interference from other memory cells. These memory cells may each be formed of a physical system ensemble represents a quantum bit in a quantum gate.

Figure 5:
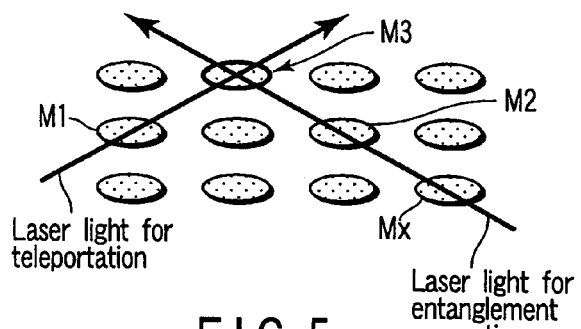
FIG. 5 is a diagram showing an example of the arrangement of memory cells in which transfer of quantum information between the storage memory cells is interfered from another memory cell.

On the other hand, for example, a quantum memory is assumed in which memory cells are arranged in an orderly fashion in a matrix as shown in FIG. 5. If the transfer memory cell M3 and the storage memory cells M1 and M2 are selected as shown in the figure, another memory cell Mx is present on the straight line M2-M3. Consequently, the laser light for entanglement generation interacts with the memory cell Mx to obstruct teleportation. For the storage memory cells M1 and M2 selected in FIG. 5, interference from other memory cells occur whatever another memory cell is set as a transfer memory cell.

However, the argument that the arrangement of the memory cells in FIGS. 3 and 4 is favorable, while the arrangement of the memory cells in FIG. 5 is not is based on the following precondition: when the two memory cells are irradiated with the laser light for entanglement generation and the laser light for teleportation so that the light pierces the memory cells, the laser light having passed through the first memory cell does not have its traveling direction positively significantly changed using a reflector or the like before passing through the second memory cell. In contrast, for example, the laser is arranged above the plane on which the memory cells are arranged, while the reflector is arranged below this plane, and the irradiation with laser light is adapted so that only two memory cells are always present on the optical path of one laser beam. Then, in principle, even the arrangement of the memory cells in FIG. 5 enables quantum information to be transferred between two arbitrary memory cells while avoiding interference from other memory cells.

EXAMPLES

Example 1

Figure 6:
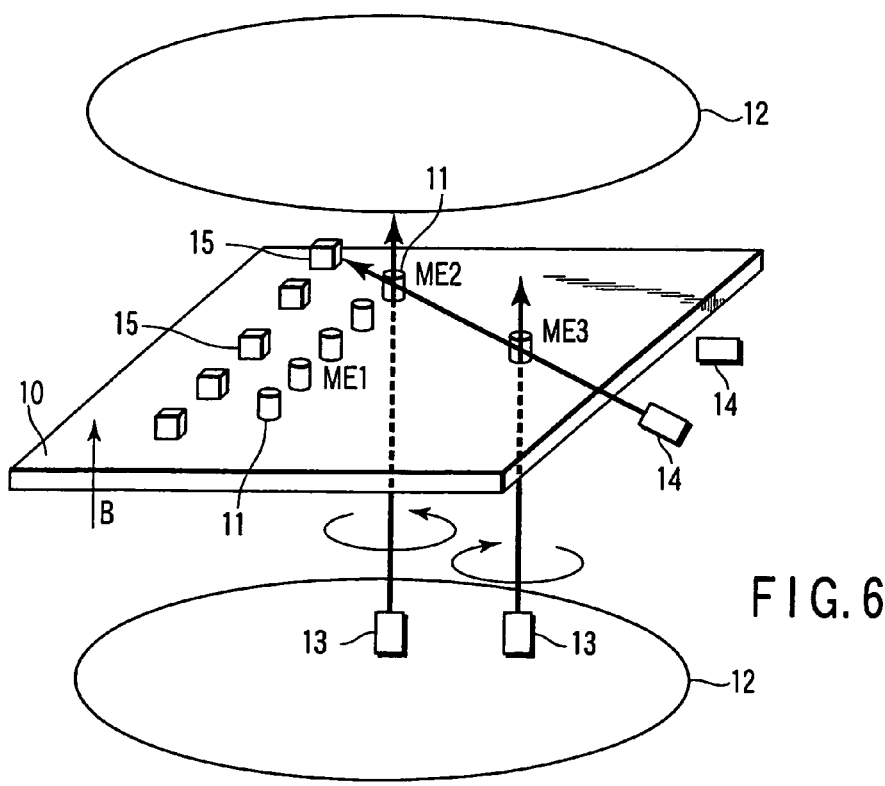
FIG. 6 is a diagram schematically showing the configuration of a quantum memory according to Example 1 of the present invention.

The quantum memory of the present example will be described with reference to FIG. 6.

Six memory cells 11 were provided in each of which cesium atomic gas was filled into a cylindrical glass cell having a radius of 1 cm and a height of 3 cm. The memory cells 11 were arranged on the same plane on a stage 10. One of the six memory cells 11 was used as the transfer memory cell transferring the quantum state (ME3), whereas the five other memory cells are used as storage memory cells storing the quantum state. In this case, the five storage memory cells were arranged on the same straight line. The transfer memory cell ME3 is arranged off the straight line on which the storage memory cells were arranged.

Coils 12, 12 were provided above and below the stage 10, respectively, so as to apply a vertically upward magnetic field of 0.9 G to all the memory cells 11.

First lasers 13 are provided below the stage 10 to irradiate all the memory cells 11 with first laser light L1. The first laser light is circularly polarized light of wavelength 852 nm which is resonant with a transition from $6S_{1/2}$ to $6P_{3/2}$. Pulse irradiation with the first laser light L1 can be carried out by on and off an acoustooptic element (not shown).

Second lasers 14 are provided on a side of the stage 10 to apply second laser light L2 to the transfer memory cell ME3 and to an arbitrary storage memory cell so that the light pierces these memory cells. The second laser light is linearly polarized light that is offset from the transition from $6S_{1/2}$ to $6P_{3/2}$, toward a short wavelength by 700 MHz. Pulse irradiation with the second laser light L2 can be carried out by on and off the acoustooptic element (not shown).

Five homodyne detectors 15 are each provided on an extension of a straight line passing from the corresponding second laser 14 through the transfer memory cell ME3 and each storage memory cell. Each of the homodyne detectors 15 splits laser light transmitted through the two memory cells into two beams with a polarization beam splitter (PBS), detects these beams to determine the difference between them, and then measures the sine and cosine components at the angular frequency of the Larmor precession of cesium atoms in an applied magnetic field with a lock-in amplifier.

Description will be given of a method of transferring the quantum state in the quantum memory configured as described above. In this case, description will be given of the case in which arbitrary two (ME1 and ME2 in FIG. 6) of five storage memory cells are selected to transfer the quantum state from memory cell ME1 to memory cell ME2.

With the magnetic field B applied, the memory cells ME1 and ME2 were irradiated with right-handed circularly polarized laser light L1. The memory cell ME3 was irradiated with left-handed circularly polarized laser light L1. As a result, the total angular momentum of cesium atomic gas contained each memory cell was established in a state of a magnetic sublevel to be set. Then, the memory cells ME3 and ME2 were irradiated with laser light L2 for 0.45 ms. Transmitted light was then subjected to homodyne detection. Moreover, 0.3 ms after the irradiation with the laser light L2, the memory cells ME3 and ME1 were irradiated with the laser light L2 for 0.45 ms to subject transmitted laser light to homodyne detection. Thus, the quantum state of the memory cell ME1 was transferred (teleported) to the memory cell ME2.

Example 2

Figure 7:
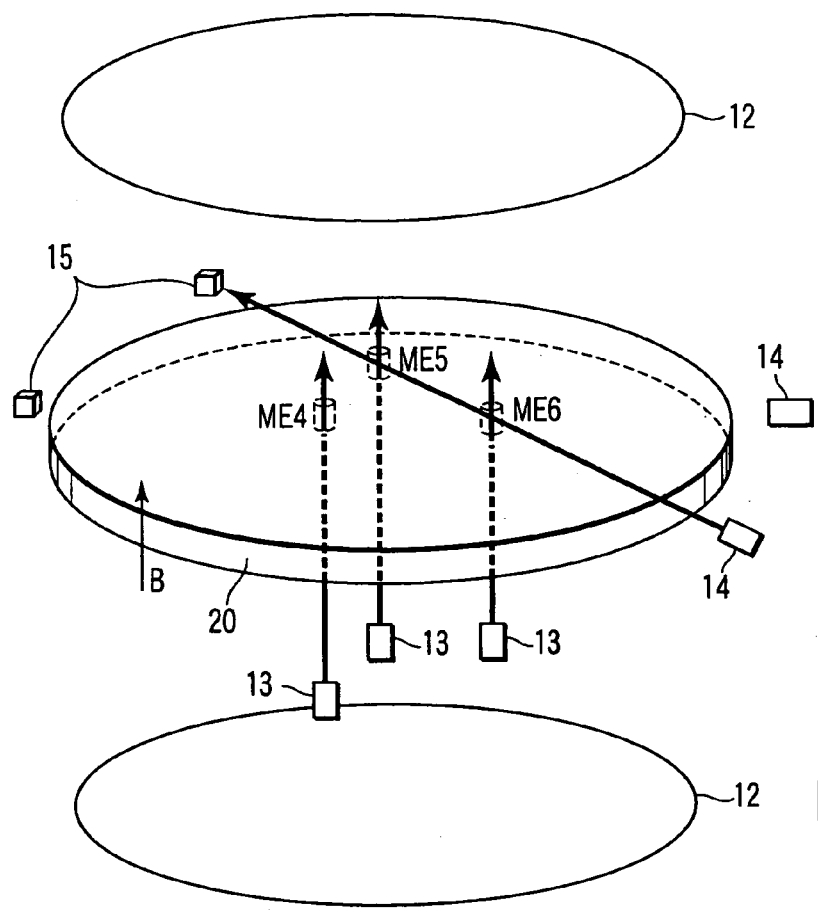
FIG. 7 is a diagram schematically showing the configuration of a quantum memory according to Example 2 of the present invention.

The quantum memory of the present example will be described below with reference to FIG. 7.

A cylindrical glass cell 20 was provided which had a radius of 20 cm and a height of 3 cm and which was filled with cesium atomic gas. The glass cell 20 was installed in place of the stage and memory cells in Example 1.

The glass cell was irradiated, in three positions of it from lower side, with light corresponding to the first laser light L1 in Example 1 to select these parts as memory cells ME4, ME5, and ME6. The memory cells ME4 and ME5 were used to store quantum information, whereas the memory cell ME6 was used to transfer quantum information. The memory cells were subjected to light irradiation and homodyne detection similar to those carried out in Embodiment 1. Then, the quantum state of the memory cell ME4 could be transferred to the memory cell ME5.

By selectively irradiating a spatially continuously and uniformly distributed substance with light without using partitions (or space where no medium used as the memory cell is present) to separate the memory cells from one another as described in the present example, physical system ensembles in a part of the substance can be utilized as memory cells. Therefore, memory cells can be contained in the spatially continuously and uniformly distributed substance.

Example 3

Six cylindrical $Y_2SiO_5$ crystals were provided each of which had a radius of 1 mm and a height of 2 mm and to each of which 0.05% of $Pr^{3+}$ ions were added (0.05% of the $Y^{3+}$ ions were replaced with $Pr^{3+}$ ions). These crystals were mounted on the stage and used as memory cells in place of the glass cell containing cesium atomic gas in Example 1. All the memory cells consisting of the $Y_2SiO_5$ crystals, including the stage, were placed in a cryostat with an optical window and cooled at 3.8 K.

Third laser light L3 was used instead of the first laser light L1 in Example 1. The laser light L3 was circularly polarized light of wavelength 606 nm resonant with the transition from $^3H_4$ to $^1D_2$ of the $Pr^{3+}$ ion.

Fourth laser light L4 was used instead of the second laser light L2 in Example 1. The laser light L4 was linearly polarized light that was offset from the transition from $^3H_4$ to $^1D_2$ of the $Pr^{3+}$ ion toward the short wavelength by 20 GHz.

Operations similar to those of Example 1 were performed on the quantum memory configured as described above. As a result, the quantum state of the rare earth ion ensemble could be transferred between two arbitrary crystals corresponding to storage memory cells.

Example 4

The quantum memory of the present example will be described below with reference to FIG. 8.

As memory cells, six cylindrical $Y_2SiO_5$ crystals were provided each of which had a radius of 0.25 mm and a height of 0.5 mm and to each of which 0.05% of $Pr^{3+}$ ions were added (0.05% of the $Y^{3+}$ ions were replaced with $Pr^{3+}$ ions). These memory cells 31 were mounted on a rotating stage 30. At this time, the six memory cells 31 were arranged at the vertices of a regular octagon and at its center, respectively. The central memory cell was used as the transfer memory cell, while the five surrounding memory cells were used as storage memory cells. Rotating the stage 30 rotated the storage memory cells around the transfer memory cell in the plane on which the transfer and storage memory cells were distributed. All of the six memory cells 31 consisting of the $Y_2SiO_5$ crystals, including the rotating stage 31, were placed in the cryostat with the optical window and cooled at 3.8 K. Coils 32, 32 were provided above and below the stage 30, respectively, so as to apply a vertically upward magnetic field B to all the memory cells 31.

Figure 8:
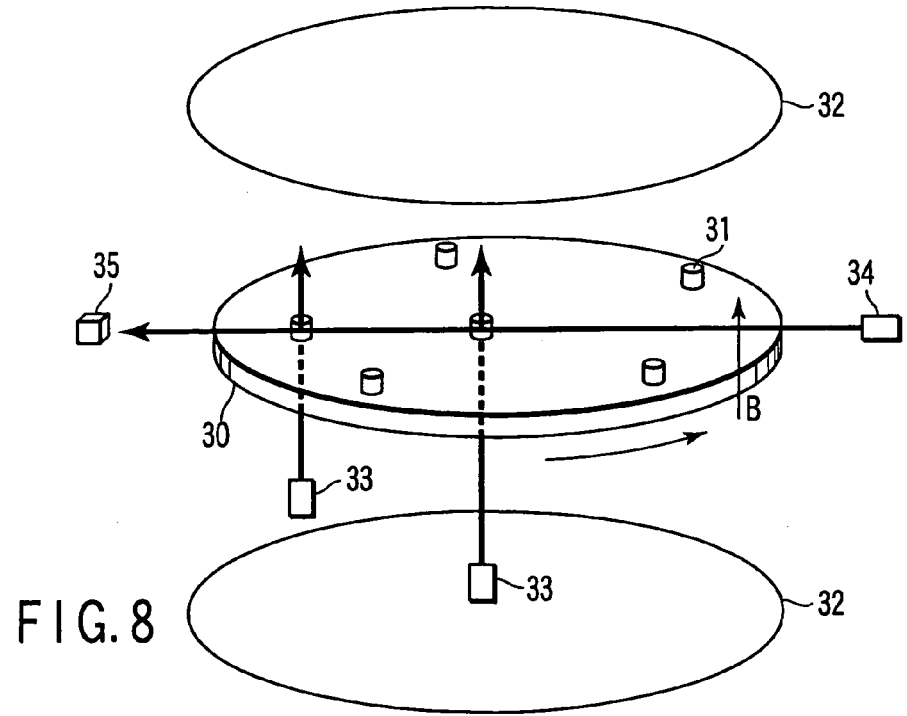
FIG. 8 is a diagram schematically showing the configuration of a quantum memory according to Example 4 of the present invention.

In the present example, entanglement generation and teleportation are always carried out on the single straight line (corresponding to the diameter of the rotating stage 30) shown in FIG. 8. The stage 30 is rotated between operations to move the positions of the storage memory cells. In the figure, the position of the central transfer memory cell and the position of one storage memory cell transferred to a predetermined point on the circumference are called "operation positions".

Third lasers 33 applying the third laser light L3, described in Example 3, are provided below the rotating stage 30, i.e., below the transfer and storage memory cells arranged at their operation positions. A fourth laser 34 is provided on a side of the rotating stage 30 to apply the fourth laser light L4, described in Example 3, so that the light pierces the transfer and storage memory cells arranged at their operation positions. A homodyne detector 35 is provided on an extension of a straight line passing from the fourth laser 34 through the transfer and storage memory cells arranged at their operation positions.

In the quantum memory configured as described above, the transfer memory cell and one storage memory cell were irradiated with the fourth laser light to generate entanglement. Then, the stage 30 was rotated to move another storage memory cell to its operation position. Subsequently, these memory cells were irradiated with the fourth laser light and then Bell measurement was carried out. Thus, quantum teleportation could be executed between arbitrary storage memory cells. Therefore, compared to the quantum memory in FIG. 6 or 7, the number of lasers and homodyne detectors could be reduced. This served to make simply the configuration of the device.

Example 5

A quantum memory was produced using 10 glass cells filled with cesium atomic gas as memory cells, in place of the 6 glass cells filled with cesium atomic gas in Example 1, and arranging these memory cells on the same circumference.

In this case, when at least one memory cell was not utilized to store quantum information, it could be set as a transfer memory cell to transfer quantum information between two arbitrary memory cells. Therefore, two or more pieces of quantum information could also be transferred simultaneously.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing method using a quantum memory in which memory cells are provided, each of the memory cells being formed of a physical system ensemble, the physical system ensemble comprising physical systems configured to have a total angular momentum of magnetic sublevels, quantum information of the physical system ensemble being expressed by a quantum state of whole amount of the total angular momentum of the physical systems, at least one of the memory cells being used as a transfer memory cell A transferring the quantum state, memory cells other than the transfer memory cell A being used as storage memory cells storing the quantum state, and in which a set of two arbitrary memory cells V and B is selected from the storage memory cells and the quantum state of the memory cell V is transferred to the memory cell B, the method comprising:

applying a magnetic field to each memory cell and irradiating each memory cell with right-handed or left-handed polarized light to establish an energy state in which the total angular momentum of the entire physical system ensemble forming each memory cell has a particular value;

simultaneously irradiating only the two memory cells A and B with one laser beam, detecting a polarization state of the laser beam transmitted through both memory cells, and generating entanglement for the memory cells A and B; and simultaneously irradiating only the two memory cells A and V with one laser beam, detecting a polarization state of the laser beam transmitted through both memory cells, and teleporting the quantum state of the memory cell V to the memory cell B in which the entanglement with the memory cell A has been generated.

2. The method according to claim 1, wherein the memory cell is formed of a physical system ensemble distributed in a part of a space where an ensemble angular momentum is generated by selectively irradiating a spatially continuously and uniformly distributed substance with light, and the substance contains memory cells.

3. The method according to claim 1, wherein the physical system ensemble consists of gas atoms.

4. The method according to claim 1, wherein the physical system ensemble consists of rare earth ions in a solid.

5. The method according to claim 1, comprising detecting cosine and sine components of a polarization state of the laser beam transmitted through the two memory cells at an angular frequency of Larmor precession with a homodyne detector.

6. The method according to claim 1, wherein the memory cells are arranged on a same plane at vertices and at a center of a regular polygon having an odd number of vertices, and wherein the memory cell arranged at the center of the regular polygon is used as the transfer memory cell and the memory cells arranged at vertices of the regular polygon are used as the storage memory cells.

7. The method according to claim 1, wherein the memory cells are arranged on a same circumference, and wherein a memory cell is used as the transfer memory cell and the other memory cells are used as the storage memory cells.

* * * * *